Sept. 28, 1971  J. H. LEMELSON  3,608,183
METHOD OF FABRICATING A REINFORCED MATERIAL
Filed March 27, 1969  2 Sheets-Sheet 1
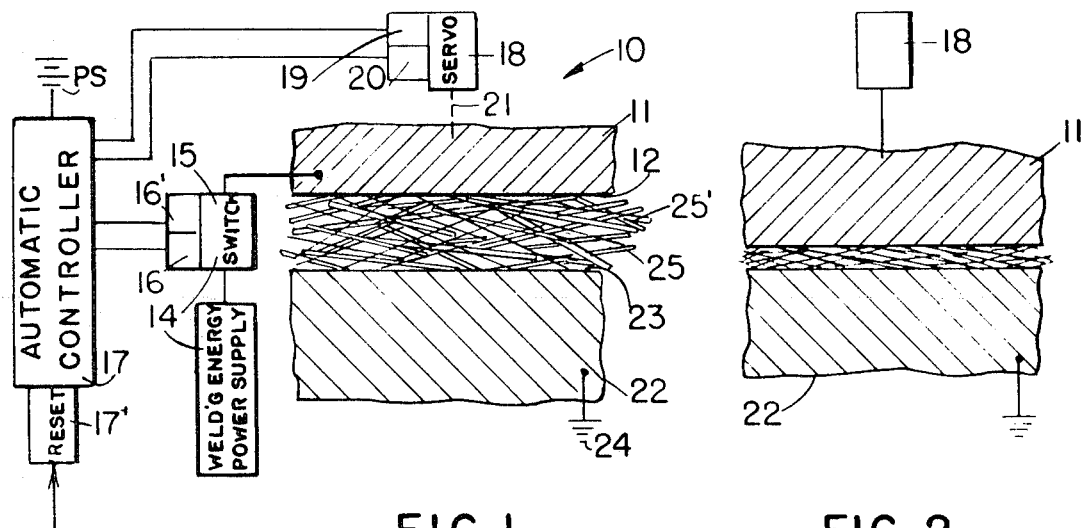
FIG. 1         FIG. 2
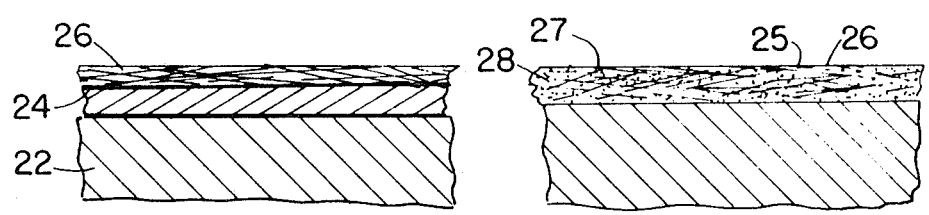
FIG. 3         FIG. 4
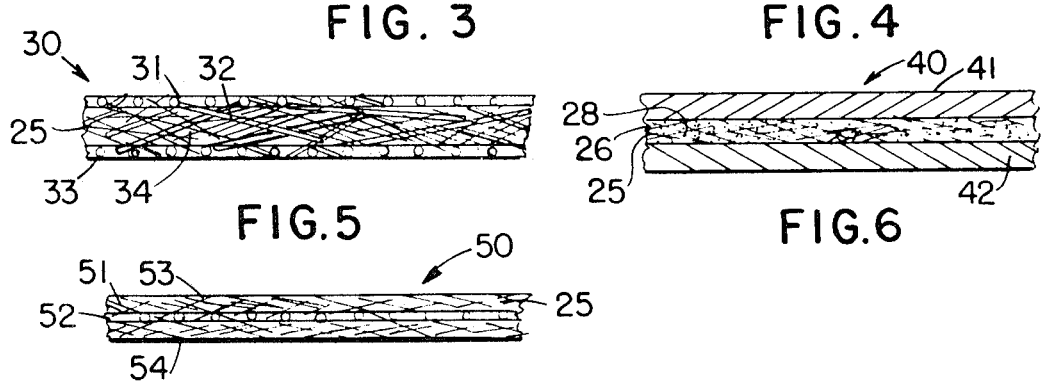
FIG. 5         FIG. 6
FIG. 7
INVENTOR.
Jerome H. Lemelson Sept. 28, 1971     J. H. LEMELSON     3,608,183

METHOD OF FABRICATING A REINFORCED MATERIAL

Filed March 27, 1969     2 Sheets-Sheet 2

INVENTOR.
Jerome H. Lemelson

United States Patent Office 3,608,183
Patented Sept. 28, 1971

3,608,183
METHOD OF FABRICATING A REINFORCED MATERIAL
Jerome H. Lemelson, 85 Rector St., Metuchen, N.J. 08840
Continuation-in-part of application Ser. No. 573,148, July 26, 1966, now Patent No. 3,437,783, which is a continuation-in-part of application Ser. No. 239,034, Nov. 20, 1962. This application Mar. 27, 1969, Ser. No. 814,885
Int. Cl. B23k 19/00
U.S. Cl. 29—527.7
10 Claims

ABSTRACT OF THE DISCLOSURE

A method for producing a composite material and the improved material structure which is composed of a matrix and a plurality of reinforcing elements which are combined within said matrix to form a unitary structure therewith. The reinforcing elements may comprise metal wires, filaments or whiskers disposed within a ceramic matrix or substrate wherein the filaments serve to reinforce the matrix material.

The process involves continuously feeding a plurality of filaments and matrix material to a die and thereafter predeterminately forming a continuous shape thereof. In one form, the filaments or whiskers are continuously formed as they are fed to the die or mold employed to form the composite material; the filaments may also be fabricated of glass, ceramic, polymers or carbonized material which may be randomly or evenly dispersed within the matrix material.

RELATED APPLICATIONS

This is a continuation-in-part of application Ser. No. 573,148 filed July 26, 1966, now Pat. No. 3,437,783, for Matte Structure and Method for Producing Same which is a continuation-in-part of application Ser. No. 293,034 filed Nov. 20, 1962, and entitled Composite Article.

SUMMARY OF THE INVENTION

This invention relates to an apparatus and method for producing a composite article and the novel composite article produced thereby.

It is known in the art to reinforce certain materials such as plastics with filaments of glass and other polymers which are generally premixed and compounded with the polymer prior to molding same to shape. However, for the most part, the filaments within the matrix are unjoined and separately operate to reinforce said matrix.

The instant invention is primarily concerned with the continuous formation of filament reinforced materials and particularly those containing filaments which are integrally welded together within the matrix. Thus, forces applied to the entire composite article may be transferred from filament to filament, rather than from the matrix to the different filaments and a new and improved structure is derived.

Accordingly, it is a primary object of this invention to provide a new and improved structure in a composite article made up on a matrix reinforced throughout with a plurality of filaments which are welded together.

Another object is to provide an apparatus and method for producing composite articles composed of joined filaments disposed in a matrix.

Another object is to provide an improved apparatus and method for continuously producing filament-reinforced composite articles.

Another object is to provide an apparatus and method for continuously forming composite articles of metal or ceramic materials which are internally reinforced with filaments or whiskers which greatly enhance the strength of the articles.

Another object is to provide a new and improved apparatus for continuousy forming and casting elongated structural members.

Another object is to provide a new and improved apparatus and method for forming structural members by combining extrusion and/or casting and draw forming procedures in a single operation.

With the above and such other objects in view as may hereafter more fully appear, the invention consists of the novel constructions, combinations and arrangements of parts as will be more fully described and illustrated in the accompanying drawings, but it is to be understood that changes, variations, modifications may be resorted to which fall within the scope of the invention as claimed.

In the drawings:

FIG. 1 is a side view in cross section of fragmentary portions of a welding apparatus and controls therefore for forming a matte or porous sheet of fibers or filaments;

FIG. 2 shows the apparatus of FIG. 1 compressing and welding the filaments into a thinner matte or sheet;

FIG. 3 is a cross sectional view of a fragment of one of the welding members of FIG. 1 with a composite article disposed against its surface;

FIG. 4 is a fragmentary view of a welding apparatus containing a modified form of filamented material produced thereon;

FIG. 5 is a fragmentary view of a modified form of filamented material produced by apparatus of the type shown in FIG. 1 and having a perforated metal sheet or screen welded to each surface thereof;

FIG. 6 is a fragmentary view of a modified form of the material of FIG. 4 having coatings or sheet members bonded or welded to its opposite surfaces;

FIG. 7 is a fragmentary view of a modified form of a filamented material having a screen member extending through the central portion thereof;

Figures 8, 9:
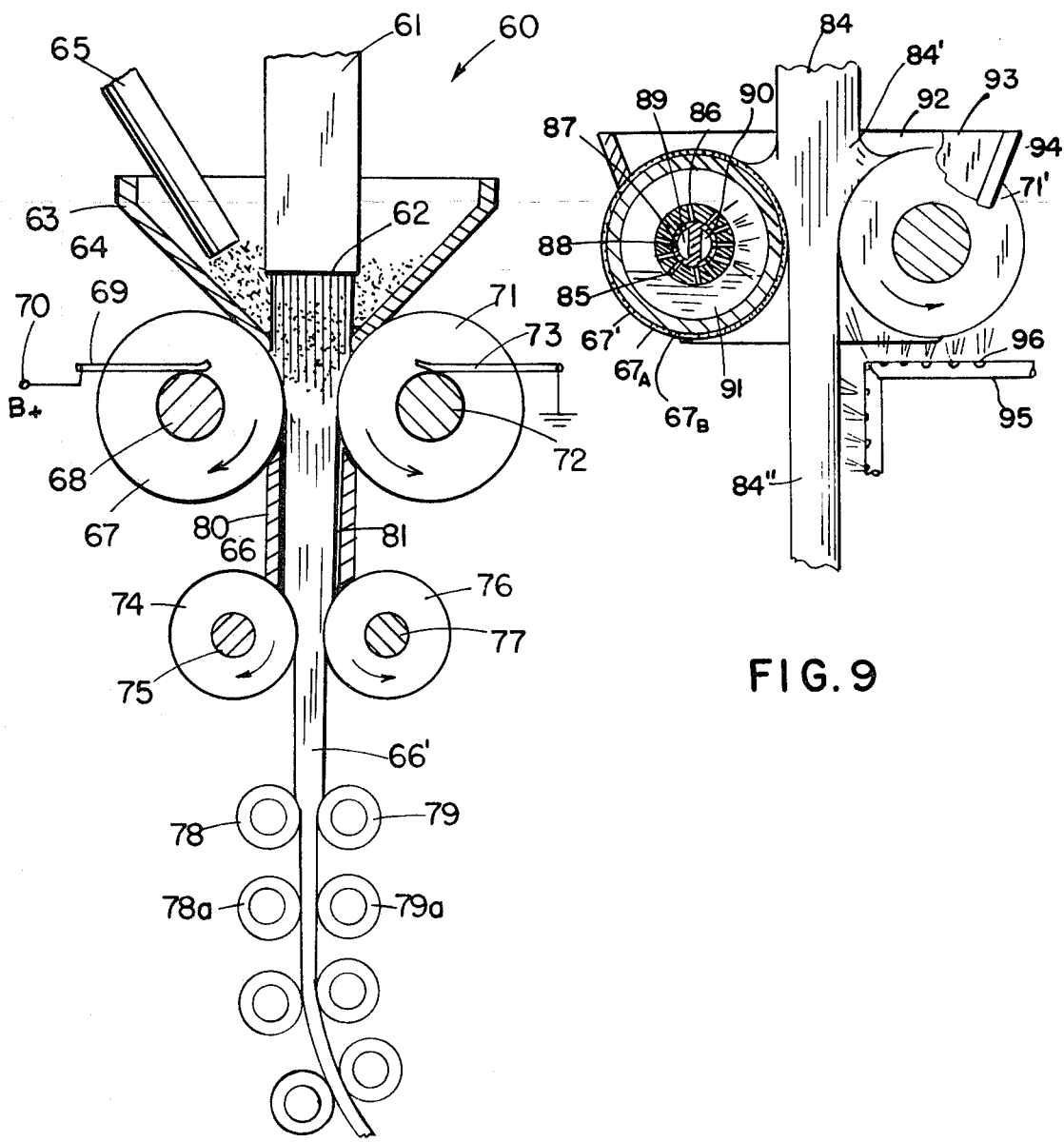
FIG. 8 is a side view with parts broken away for clarity of a continuous production apparatus for material of the type shown in the other figures or other materials.
FIG. 9 is a partial view of a modified form of the apparatus of FIG. 8.

FIG. 1 illustrates an apparatus operative to produce a new and improved mesh or matte structure from individual filaments, fibers or whisker elements disposed in said apparatus. Such mesh structure is denoted by the general notation 26 as illustrated in FIGS. 3 and 4, has various useful applications such as the fabrication of composite articles and panels which are reinforced by the matte, the fabrication of filters employing the matte and other structural elements which will be described.

In FIG. 1 a plurality of elongated filament elements 25 such as individual so-called single crystal whiskers or wires made of any suitable metal are disposed in a random array as a layer 25' on the upper surface 23 of an electrode plate roller or die portion 22 of a press apparatus 10 which also includes a movable platen electrode 11 having a lower surface 12 operative to engage and compress the filament elements 25 therebetween and the member 22. Member 22 may comprise the lower platen of a compression press and member 11 the upper platen thereof or said members may comprise flat dies or dies of any suitable configuration which are secured to the base and upper platen of a reciprocating or rotary press or the like. Member 11 is shown electrically connected to a source 14 of direct or alternating current of sufficient potential to effect the resistance welding of the filament elements 25 together where they cross each other when the surface 12 of member 11 predeterminately compresses the filament elements against the upper surface 23 of the lower member 22. In other words, the members 11 and 22 serve a plurality of purposes including their movement together to compress the randomly arrayed filaments 25 into a more compact matte and to predeterminately shape same. Said members 11 and 22 also serve as resistance welding electrodes to transmit sufficient electrical energy to the filaments to effect resistance welding of the filaments to each other at those points along the length of the filaments which make surface contact with each other and, of course, present the highest resistance to the transmission of electrical energy from the electrode 11 to electrode 22 which is shown grounded by grounding means 24. As a result of the resistance welding action described, the elements 25 will remain substantially in the compressed state when electrode 11 is withdrawn from its downward-most stroke location as illustrated in FIG. 2.

Illustrated schematically in FIG. 1 are elements for effecting control of the compression and welding apparatus. The upper die 11 is raised and lowered to move along suitable guide means (not shown) by a hydraulic, pneumatic or electrical servo motor designated 18 having an output shaft 21 operatively connected to the platen 11 and controls 19 and 20 which, when energized, effect the operation of the motor device 18 to respectively lower and raise the die member of platen 11.

Notation 14 refers to a source of suitable electrical potential which is electrically connected to conducting die 11 and has a bistable switching control means 15 including an input 16 thereto which, when energized, gates electrical potential from source 14 to the electrode 11 and a second input 16' which, when energized, deactivates a switching control associated with 14 for either deactivating the potential source or opening a switch connected therebetween and electrode 11. Any suitable automatic controller may be operative to predeterminately control the servo device 18 and electrical potential source 14 so that welding energy is provided only upon the predetermined compression of the filament or whisker elements 25 between the two press members 11 and 22. Illustrated in FIG. 1 is a self-recycling multicircuit timer 17 having an energizing input 17' thereto which, when pulsed, causes the controller 17 to cycle once and supply electrical energy or signals for controlling the servo 18 and the gating means 15 and 16 for the welding power supply 14. The input to the start cycle control 17' of controller 17 may be a manual push-button switch or a control activated by an automatic means when the proper amount or number of filaments elements 25 are deposited on the upper surface 23 of the lower platen 22. In other words, a suitable, automatically controlled feed means (not shown) may be utilized to feed a predetermined quantity or layer of filament elements to the platen 22 as illustrated in FIG. 1 and the same or auxiliary means may be utilized to remove the compressed and welded matte of filaments from the upper surface 23 of member 22 in a cycle which includes the generation of a further signal operative to activate the cycle controller 17.

While the matte 26 of compressed and welded filament elements 25 may be withdrawn from between the members 11 and 22 as an article of any suitable thickness and shape, it may also be welded to one or more members disposed between electrodes 11 and 22 or to the electrodes themselves which form part of a composite article.

In FIG. 3, a plate or sheet 24 of conducting material such as metal has been disposed on the upper surface of the electrode 22 forming a conducting path and the filament elements 25 disposed on top of said plate are shown compressed and welded not only together by the means described but also to the member 24. The lower elements of the layer thereof defining the matte 26 are welded to the upper surface of member 24 where they make surface contact therewith, by the same electrical energy utilized to weld the filament elements together. In other words, in a single stroke a composite article may be provided by the apparatus of FIG. 1 which comprises either a plurality of metal filaments which are compressed and are welded to each other, forming a matte or mesh structure or said welded filaments may be further welded to a sheet or plate disposed therebeneath, and, in certain instances, to a second sheet or plate disposed along the upper surface of the matte to form new and improved composite articles which may be utilized for forming reinforced structures, fluid filters or other purposes.

In FIG. 4 is shown a plurality of filaments of the type described which are disposed on the upper surface of a die or platen 22 or panel member forming a part of the composite article. Filling the interstices is a filler material 27 of any suitable composition. In a preferred embodiment of the invention, the filler material 27 may comprise a metal such as aluminum, titanium, copper or steel which is substantially reinforced by the compressed filament elements 25 or a ceramic or composite material such as aluminum oxide, titanium carbide, boron nitride, or other suitable metal or non-metal including polymers or the like which completely fills the voids in the mesh 26 formed of the filament elements 25. Such material may be flowed into the voids in the filament elements prior to or after the welding of said elements and while the mesh is disposed against the die or some time thereafter.

In one mode of fabricating the composite material 28 of FIG. 4, powdered metal may be flowed to fill the voids in the mesh and may be compressed or sintered by the action of the press members described and heat generated across the electrodes by resistance heating means of the type described. In other words, the composite member or panel 28 may be fabricated by disposing a plurality of filament elements as a layer on the upper surface of a die such as 23 and, either before or after welding said elements together as described, flowing, pouring or spraying particles of metal or other suitable material to fill the interstice between the filament elements to form a unitary whisker or wire-reinforced solid member. If powdered metal is utilized, the generation of sufficient electrical potential between the press members or electrodes used to form the reinforced composite material may be utilized to melt or sinter the powdered material into a unitary mass with the filament elements extending through said mass as reinforcing means therefor. Here again, as in the embodiments described above, the filament reinforced composite of FIG. 4 may be solid through and through and may be formed per se or welded to a single sheet of metal or between two sheets of metal or suitable composite materials of any suitable shape.

New articles of manufacture which may be fabricated utilizing the apparatus described, are illustrated in FIGS. 5–7. In FIG. 5 is shown a new type of mesh or matte which may be utilized for reinforcing purposes or as a filter element. The composite structure 30 comprises an upper screen 31 made of substantially uniformly woven or otherwise arrayed filament elements 32 and a lower screen 33 made of similarly uniformly arrayed elements 34. Disposed between the upper screen 31 and the lower screen 33 is a matte array as described of filament elements or whiskers 25 which are compressed and resistance welded to each other as described and are also resistance welded to the upper and lower screen members 31 and 33. The screens 31 and 33 serve to define relatively smooth cappings members for the internal mesh 26 formed of the elements 25 and may also be made of perforated metal sheets. The structure illustrated in FIG. 5 may be formed to any suitable shape and may also include a filler material disposed between screen members 31 and 33 and provided as described. Members 31 and 33 may be disposed on both sides of a matte of the elements 25 prior to welding the entire assembly together as described.

In FIG. 6, a composite material 40 comprises a lower plate 42 having disposed on its upper surface a welded mesh or matte 26 as described which is filled with a suitable filler material 28 as described. A further plate 41 caps the upper surface of the filler comprising mesh 26 and material 28 and the two plates 41 and 42 are either welded or adhesively bonded to the material therebetween.

In FIG. 7, a composite material 50 is shown in sheet form and includes a matte or compressed and welded sheet 51 of metal, ceramic, glass or plastic filaments 25 as described and having disposed between the major faces 53 and 54 of the member 51, a screen member 52. The member 52, which may comprise woven or welded metal or plastic filaments or woven ceramic filaments may serve as a reinforcing means for the compressed matte 51 and/or as a conducting means for electricity. In the latter function, member 52 may serve as a resistance heating element to transfer heat to the welding or banded elements of compressed matte 51 and or fluid passing therethrough or over said composite member 50. If the filaments 25 are conducting metal, the elements of member 52 may be copper, aluminum, niobium or other metal coated or covered with an insulating material such as a ceramic or oxide film to preventing grounding to the elements of the matte 51. If member 50 is used as a fluid filter medium, catalyst means for chemical reactions involving fluids or as an element in a magnetohydrodynamic apparatus or electrostatic apparatus, sufficient voltage may be applied across input and output portions of member 52 to effect the desired glow discharge, electro-static or electromagnetic action with respect to the surrounding fluid medium.

In the embodiment of FIG. 7, suitable metal, ceramic and/or plastic particulate material may be sintered in situ within the interstices of the elements 25 of member 52 which may also extend through element 52, applied thereto as described. Liquid metal, ceramic or plastic material may also be flowed or sprayed into the interstices and solidified in situ therein to provide a solid member 50.

The screen members 31, 33 and 52 of FIGS. 5 and 7 may comprise a perforated metal sheet or otherwise formed porous member.

Variations in the apparatus and methods for forming the composite materials described in FIGS. 1 to 4 include the following:

(I) The flat platen reciprocating dies or electrodes 11 and 22 of FIGS. 1 and 2 may be replaced by respective roller dies and electrodes each of which is power driven to rotate in the proper manner proximate to the other while the plurality of wires or whiskers 25 are predeterminately fed therebetween to be engaged and compressed by each roller and to be welded together on a continuous basis by conducting direct or alternating current of sufficient potential to one of the metal rollers while grounding the other metal roller to effect the welding described. Such an apparatus may be utilized to continuously produce a mesh or matte of the type described and may be operated to feed the matte either horizontally therefrom onto a conveyor or downwardly therefrom where it is guided by further roller means to further pocessing apparatus. In other words, the conducting compression rollers are so spaced and the filament elements fed thereto as a preformed matte or random array in such a manner and quantity as to effect the compression of filaments to permit the resistance welding thereof as described and to form a sheet-like array or matte of said welded filaments by the time they are driven completely through the rollers by the action of said rollers and, in certain instances, by passing the welded matte through one or more pairs of drive rolls situated downstream of the compression and welding rolls. In other words, once the matte of filaments is welded together by resistance welding means as described between the rolls, it becomes a unitary elongated member such as a belt-like array of filaments which may be drawn under tension from the rollers.

Roller apparatus as described may also be modified to permit the flowing of a filler material simultaneously with the filament elements between the rollers to completely fill the voids therebetween forming a unitary panel structure therewith as described and said filament material may comprise any suitable metal or non-metal in particulate, molten or semi-molten condition when so fed. If the flow of material is downwardly, gravity may be employed to advantage for regulating the flow of filler material between the rolls and retaining same in the interstice in the freshly formed matte, particularly if the filler material is operative to solidify or semi-solidify by the time it egresses from between the rollers.

(II) In another form of the invention, it is noted that filaments of thermoplastic material such as rigid or semi-flexible polyvinylchloride, polyethylene, polypropylene, polycarbonate, nylon or other suitable plastic may be disposed as illustrated and may be welded together by the application of sufficient heat or radio frequency energy between the electrodes 11 and 22 to effect welding of those filaments which cross each other at the points of contact. Here again, the mesh or matte may be utilized per se or may be filled with a bulk filler material of the same or a different plastic such as a cellular plastic or solid plastic mass and used to reinforce or decorate same. In the embodiment of FIG. 3, the sheet 24 may comprise a thermosetting or thermoplastic rigid or flexible sheet and dies 11 and 22 may be heated dies per se, ultrasonic or electronic heat sealing dies operative to weld or seal the filaments together at the areas where they cross and/or weld said filaments to the base sheet 24.

(III) If the filaments or fibers 25 are aluminum, copper, titanium or other pressure weldable metal, dies 11 and 22 may be platens or rollers operative to pressure weld the filaments together.

(IV) Dies 11 and 22 may also be platens or rollers one of which connected to a source of ultrasonic energy for ultrasonically welding the metal, ceramic or plastic filaments together upon compressing said filaments.

(V) The filaments 25 may be automatically and continuously formed by such processing as extrusion, spinning or other means and intermittently fed from the forming means between reciprocating platens or continuously fed per se or in combination with the desired particle and/or sheet material to the bite of continuously rotating dies to form matte or composite sheet material as described.

(VI) The particulate material 27 of FIG. 4 may also be continuously formed and fed along with the filaments which may be continuously formed or fed from a hopper to the bite of a rolling mill to form the composite material of FIG. 4.

(VII) One or more screens or sheet members of the types shown in FIGS. 5 and 7 may be continuously formed and fed to the devices described for continuous formation of the composite sheet members illustrated and using same.

(VIII) The filament elements of the hereinbefore described composite articles may also be bonded together at the areas where the filaments or fibers touch each other by the application of sufficient heat to either or both the platen or roller dies 11, 22 to fusion weld or sinter said filaments together while compressed therebetween. Particulate plastic polymeric material may also be either consumed by such heat, heat set or converted to a further compound such as pyrolitic graphite or other temperature material to form a unitary structure with the filament serving as a core or reinforcing means for the structure.

(IX) The open cells formed between filament elements may extend throughout the member or sheet formed as described permitting it to conduct fluid for filtering and/or heat transfer purposes. The structure illustrated in FIG. 6 may be provided with the filamental central layer 36 porous or containing strip-like or other portions thereof which are capable of conducting fluids such as heat transfer fluids between sheets 41 and 42 which may be ceramic, metal or metal coated with ceramic.

(X) While the filaments or whiskers are illustrated as short, straight lengths of metal such as steel, aluminum, copper titanium, tungsten, columbium or alloys thereof, they may also comprise straight or curled filaments or whiskers of such materials as silicon carbide, silicon nitride, aluminum oxide, boron nitride, boro-silicate compositions or other high temperature materials which are bonded together at the points where they contact each other by techniques such as (a) ultrasonic welding, (b) electron beam or laser beam welding, (c) sintering thereof in the presence of a suitable welding material in particulate form which melts with the application of heat as described, (d) flowing a liquid metal into and/or through the mesh prior to or after compression, (e) metal which is plated onto the filaments by gas plating means, vapor deposition, electro-deposition or electrical glow discharge means or merely by dipping the fibers or mesh in a container of liquid metal prior to its compression as described.

(XI) The material described in FIGS. 4, 6 and 7 as filling the voids in the filament mesh may also be metal other than that of the filaments provided either in particulate form and heated to sinter or melt same in situ within the voids of the mesh or flowed into the mesh in liquid state after the compression and welding thereof.

Continuous formation of articles as described may be effected by continuously forming and feeding filaments to the bite of compression rolls and continuously feeding liquid metal therebetween which solidifies in situ in the interstices between filaments. Powered metal so fed may be melted or sintered between such heated rollers or by one or more intense radiation beams such as generated by lasers or electron beams and directed between said rollers. Such beams may be held stationary or scanned to heat and melt or sinter said powered metal and/or weld the filaments as rolling occurs.

(XII) Reinforced abrasive sheets, plates or disc members may be produced of any of the embodiments illustrated in FIGS. 3, 4, 5 or 7 by providing all or part of the particulate material disposed in the mesh of abrasive particles such aluminum oxide, boron nitride, silicon carbide, diamond or other material welded or otherwise bonded to the filaments or the sintered or fused metal or ceramic material filling same.

(XIII) In other embodiments of the invention, the matte-like filament formations of FIGS. 2, 3, 4, 6 and 7 may be made of metal, glass, ceramic or polymeric materials with the screen or reinforcing sheet materials of similar material as the matte filaments or of different material as described and the matte itself compressed and welded together along only selected separated areas of the matte. For example, the illustrated platen or roller welding dies may be shaped with protruding elements or formations which operate to compress and weld the matte fibers together only in selected areas such as spot or strip-like areas, criss-crossing strip areas or the like so that the portions of the filaments or fibers therebetween are held together at the welded areas by joining but are more open or separated from each other than those portions which are so welded together.

(XIV) In other embodiments of the invention, certain of the filament elements and/or particles welded or bonded thereto may be made of magnetized magnetic material such as so-called sintered ceramic or Alnico material to provide means for attracting magnetically susceptible particles to be filtered from a medium flowing therethrough.

(XV) In still another embodiment, the filaments of the mesh may be made of copper, aluminum or other conducting, superconducting (niobium) or semi-conducting material and may be used as a heating means when connected to a suitable source of electrical energy. If the fluid flowed through the open electrified mesh is a plasma or gas containing particles, the mesh may be used to electrify or impart a charge to said gas; electrically control its motion; impart motion to or accelerate said gas; electrostatically precipitate material from said gas or otherwise work thereon as a component of an energy transfer apparatus. If said fluid flow through the mesh is a liquid, after welding the mesh elements as described, they may be electrically insulated by coating with a suitable non-conductor ceramic, plastic or metal oxide layer. However, the elements of the mesh will conduct electricity for the purposes described as they are welded to each other to form a continuous electrical path throughout the mesh.

(XIV) In the composite article structures illustrated in FIGS. 2–7, the described compressed mattes and/or screen structures may be made of a suitable polymer which has been carbonized or rendered in the form of pyrolitic graphite or the like by subjecting said polymer to sufficient heat either prior to or after the formation of the composite article. The filaments of the matte and/or screen or net may also comprise a core such as metal, glass or other ceramic coated with a suitable polymer which is carbonized thereon by heat during the compression of the matte between the dies or after the described processing such as by radiant heating same or passing sufficient electrical energy through the core to heat same sufficiently to carbonize or pyrolize the polymer coating same to provide pyrolitic graphite filaments which are interiorly reinforced. Such as compressed welded and converted-to-graphite matte or sheet member may thus be made porous or cellular to permit same to conduct a fluid for heat transfer purposes in any of the applications hereinabove described with or without the application of electrical energy to the carbonized conducting joined filaments thereof. The interstices of the compressed carbonized material may also be filled with an ablative material or ceramic for high temperature use thereof. Such a porous graphite mass may also be produced by forming a cellular sponge like member of suitable polymeric material having intercommunicating cells throughout the member which polymer may be converted to carbon and subjecting same to high temperature radiation and heated gas flowed through the cells to convert same to carbonized material which may be used per se or, like the the carbonized matte, filled with suitable ceramic, glass, polymer or metal to form the desired composite article.

In FIG. 8 there is shown an apparatus for continuously producing materials of the type described. The apparatus 60 includes a first means 61 for continuously supplying filaments as described and feeding same downwardly into a receptacle or hopper 63. The supply means 61 may comprise a nozzle terminating a system for feeding stored filaments or the terminal head or die of an extrusion machine operative to continuously extrude a plurality of freshly formed metal or plastic filaments from a plurality of orifices at the end 62 thereof. The supply head 61 may be rotated, moved back and forth across the hopper 63 or otherwise moved to distribute the filaments or may remain stationary to feed plural parallel filaments to the hopper 63 for processing beyond the open lower end thereof. One or more further feeding means 62 may be disposed to feed particulate or liquid material as described to the hopper 63 adjacent feed means 61 to be combined with the filaments as described. The means for supplying material to the feed heads 61 and 65 may be automatically controlled to assure that the correct amount of each material is fed to the hopper.

Below hopper 63 are located two or more rotating drum dies 67 and 71 each of which rotates against the material fed therebetween in the directions of the arrows to compress and weld said filaments as described. The sidewalls 64 and 64' of hopper 63 may ride just above or against the surfaces of the drum dies 67 and 71 to effect a seal therewith. The material fed to the open end of hopper 63 passes between and is compressed between drums 67 and 71 and is driven thereby in a downwardly direction to define a sheet or other formation 66 as defined by the surface shape of the drums.

Drums 67 and 71 rotate on respective shafts 68 and 72 which are power rotated by means not shown at the same speed. Electrical energy for resistance welding is conducted to roller or drum 67 as it rotates by the engagement of a brush 69 against the shaft 68, the brush being connected to a source 70 of sufficient electrical potential. Drum 71 may be grounded per se or by means of a brush element 73 slidably engaging the shaft 72 thereof, the brush being grounded.

Rotationally mounted below rollers 67 and 71 are a plurality of rollers or drums 74 and 76 which may serve to further compress formation 66 therebetween and/or to further process same by welding or adding heat thereto to provide a second formation 66' which is guided by further powered rollers in a predetermined path such as the illustrated horizontal path away from the forming apparatus illustrated for further processing such as forming or cutting member 66' to lengths. Rollers 78, 79 may also be heated or electrically energized to perform operations on the downstream portion 66' of the material processed above.

Notations 80, 81 refer to devices disposed between drums 67, 71 and 74, 76 for guiding, confining and/or otherwise processing material 66 fed therebetween. If part of the material comprising formation 66 is molten or semi-molten, members 80, 81 may serve as guides or a conduit for preventing flow of said molten material out of the formation 66. In such function, the walls 80, 81 may slidably engage the upper and lower drums. Heat may also be conducted or radiated to formation 66 through or from devices 80, 81 which may be electrically or otherwise heated or contain one or more heat sources.

It is noted that the apparatus of FIG. 8 may be used in the form shown or modified to process a variety of materials into sheet or panel form or any suitable shape. For example, molten metal, plastic or ceramic material may be continuously fed from head 61 downwardly between drums or rollers 67, 71 to be continuously shaped therebetween so as to provide, by the time formation 66 is defined as a result of at least partial solidification of the material, a shape which substantially conforms to the shape defined by the surfaces of rollers or drums 67, 71. The material 66 may be used per se or further reduced in cross section and/or changed in shape by one or more groups of lower drums or rollers such as 74, 76, etc. If a reduction in cross section is effected by the lower pairs or series of rollers are corresponding shaped and operate to compress and roll shape member or formation 66 into a new formation such as 66' which may be further changed in shape by other cooperating rollers or drums situated therebeyond as shown. The rotational speed of each group or pair of rollers is preferably automatically controlled by closed loop control means employing feedback signal generating means measuring the speed of the material being shaped or rolled and the forces applied to the rollers, so as to maintain the proper or predetermined relations between the various variables of the process.

One or more of the illustrated groups of rollers or drums may also be cooled with fluid and/or electrical cooling means so as to increase the transfer of heat from the material to solidify portion 66 or 66' more rapidly.

In one form of application of the apparatus of FIG. 8, high strength whisker elements or filaments of any suitable metal, ceramic, plastic or glass may be formed continuously in apparatus having head 61 as a distribution means therefor, which filaments are directly fed into a molten metal, plastic or glass fed continuously into open bottom container 63 so that the resulting formation 66 comprises the solidified molten material which is internally reinforced with the filaments formed in apparatus 61. Filaments or whiskers of boron nitride, silicon carbide, aluminum oxide, titanium carbide, etc. may be continuously formed or provided from a formed supply thereof as a steady flow of filaments in parallel or random array of any desired density into molten metal, ceramic or other material fed to hopper 63 so that, not only is the shape of the molten material predetermined by the operation of the rollers but the location and density of reinforcing filaments is also predetermined.

Liquid, powdered or pelletized metal such as aluminum, steel or other metal may also be fed to hopper 63 as formed or from a supply thereof and rolled or cast to shape as defined by the illustrated rollers. The rolls situated beyond the location where the material solidifies may also be utilized to draw shape the feeding formation to a desired shape and to predeterminately control the grain or molecular structure of the material being shaped by stressing and rolling same.

There is shown in FIG. 9 a modified form of the apparatus of FIG. 8 and details of means for transferring heat from the rollers between which material is extruded or cast as described. The apparatus of FIG. 9 includes means, not shown, such as an extruder or other source of molten or semi-molten material 84 operative to provide said material as a steady stream in a downward direction to distribute same above and between two power-driven rotating drums or rollers 67' and 71' for performing the functions of shaping, at least partially solidifying and downwardly driving an elongated formation 84'' of the material 84 fed therebetween. Roller 67' is power rotated in a clockwise direction and 71' in a counterclockwise direction as indicated by the arrows. Notation 84' refers to a puddle of the molten material 84 disposed immediately above the rollers which supplies molten material to shape the upper end of the downwardly moving configuration 84'' the shape of which is determined by the surface shape and spacing of the rollers 67' and 71'. The rate of flow of material 84 to the mass 84' is therefore predeterminately controlled in accordance with the temperature and characteristics of the material being cast or rolled to shape and upon such other variables as the rate of heat transfer from the material, the velocity of formation 84'', etc. The rollers 67' and 71' preferably rotate whereby the outer surfaces of each are travelling at a velocity equivalent to the velocity of the solidified member 84''.

The material 84 fed to the upper surfaces of the rollers may comprise molten or semi-molten metal fed by gravity, molten or semi-molten ceramic materials fed by gravity or molten or semi-molten polymers also fed by gravity. The material 84 may also be extruded to the bite of the oppositely rotating rollers 67' and 71' as a single billet, a plurality of filaments as described or other suitable shape of shapes. Said material 84 may also comprise pelletized or particulated material of the type described.

If the material 84 is molten, it may be confined to a volume between rollers 67' and 71' by properly shaping the end portions of each roller to engage each other and/or by means of a container 92 having side walls 93 and end walls 94 slidably engaging the ends of the rollers and the surfaces of the rollers to provide a seal therewith particularly in alignment with the reservoir 84' of casting material so as to prevent said material from flowing sideways off the rolls. Such container may be replaced by plates such as the end walls 93 thereof which are spring loaded to compress against the end faces of rollers 67' and 71' to provide such a seal and preventing lateral flow of casting material beyond the rolls.

If the material being cast between the rollers is molten or semi-molten metal provided at temperatures between 1000 and 3000° F. both the confining container or end plates 93 and rollers 67' and 71' may be made of, clad or coated with, high-temperature resistant materials such as molybdenum, molybdenum alloys, tungsten, tungsten alloys, various high temperature ceramic materials such as tungsten carbide, titanium carbide, aluminum oxide or the like.

Drum 67' is shown in cross section as comprising a cylindrical wall 67a made of metal such as maraging steel which is clad or coated with a high temperature oxidation-resistant material 67b as described which serves to prevent heat corrosion thereto.

Roller 67' is cooled during its operation by providing a hollow shaft 85 having radial holes 86 therein and rotating on an inner shaft 87 having passageways 89 and 90 communicating with the passageways 86 in the outer shaft 85 through a plurality of holes 88 disposed radially in the wall of the inner shaft. Passageway 90 is operative to provide a coolant fluid such as water under pressure which flows through radial holes 88 in the wall of the inner shaft and through the radial holes 86 in the wall of the outer shaft 85 when said holes come into alignment with each other and provides a pulsating spray against the inside surface of the cylindrical wall of roller 67' for cooling same. Passageway 89 in inner shaft 87 is connected to a pump and is operative to receive water and/or steam provided in volume 91 after heat has been transferred thereto so as to rapidly remove same from volume 91 to permit the rapid cooling of the roller and thereby the rapid solidification of the casting material.

Also provided in FIG. 9 is a conduit 95 containing a plurality of openings 96 therein for spraying heat transfer fluid such as water against the down stream side of the roller 71' and the surface of cast member 84" to rapidly cool same.

Material to be combined with that provided originally as shape 84 may be injected, gravity fed or power driven directly into the puddle formation 84' prior to compression of the mass between rollers 67' and 71'. Said additive material may be in the form of molten material, particulate material, pellets, filaments, whiskers or otherwise shaped material.

The downwardly moving shape 84" may be immediately fed between further power driven rollers as described to reduce or change its cross section and/or to draw same into one or more further shapes of cross section less than that of 84". By providing a mandrel between rollers 67' and 71' which mandrel is supported from above said rollers, tubular shapes may also be formed between the peripheral surfaces of the rollers which surfaces may be of regular or irregular configurations to define flat, curved or irregular surface shapes for member 84".

Apparatus of the type illustrated in FIGS. 8 and 9 has particular advantage over conventional continuous casting apparatus in which an elongated shape is downwardly cast through an open mold or die which is subject to rapid erosion caused by movement of the shape being cast. The drums or rollers provided in FIGS. 8 and 9 are in constant rotation, preferably in a manner such that the surface velocities of the drums and the shape 84" are substantially the same so as to provide a minimum degree of erosion to the surfaces of the rollers. By providing adjustable means for the shafts on which said rollers rotate to take up for any wear, such a continuous casting or rolling process may be operated for long periods of time without replacement of the rollers resulting in substantially less down-time than would be experienced employing conventional continuous casting dies or molds.

By drawing the material formations 66' or 84" immediately after they are roll formed or cast, improved process is provided whereby structural members may be drawn to shape without the need for reheating billets, slabs, or tubes of material as is the conventional practice is drawing shapes of metal.

I claim:

1. A method for continuously fabricating a structural material composed of a matrix having reinforcements integral therewith comprising:
    continuously feeding a molten material into a mold means operative to receive and predetermine its shape to define said matrix,
    continuously casting said molten material through said mold means for shaping same,
    continuously adding to said molten matrix material a multitude of discontinuous reinforcing filaments made of material having a greater tensile strength than the tensile strength of said solidified matrix material and predeterminately distributing said filaments in said matrix material,
    forming said filament containing matrix material into a predetermined elongated shape by passing same through said mold means, and
    solidifying said matrix material to define a structural member which is composed primarily of said matrix material encapsulating said filaments therein so as to reinforce said matrix material with said filaments.

2. A method in accordance with claim 1, whereby said filamentary material is continuously formed and fed with said matrix material to said shaping means.

3. A method in accordance with claim 1, whereby said mold means includes at least two spaced apart rollers, said method including preventing the lateral flow of said material from beyond the ends of said rollers, power operating said rollers in opposite directions to downwardly drive material fed therebetween and to cause the rollers to cooperatively engage and form opposite faces of the material, and causing said fluent material to at least partly solidify between the rollers whereby material feeding beyond the rollers will have a defined shape and may be driven from the rollers.

4. A method in accordance with claim 3, whereby the feeding step includes extruding said material directly between the rollers to permit the extruder material to be worked by the rollers.

5. A method in accordance with claim 4, including feeding said material as a plurality of filaments and a fluent matrix material to the bite of said rollers and power operating said rollers in a manner to form a solid structural member of said filaments and said fluent material.

6. A method in accordance with claim 5, whereby said fluent material in a particulate material, said method further including operating on said material as it passes between said rollers to form a solid body of said particulate material encapsulating said filaments therein.

7. A method in accordance with claim 6, including electrically energizing said rollers so as to bond the particles of said particulate material together into a solid mass and encapsulating said particles therein.

8. A method in accordance with claim 7, including melting said particulate material between said rollers and solidifying the melted material about said filaments to provide a solid structural member beyond said rollers.

9. A method for continuously fabricating a structural material composed of a matrix having reinforcements integral therewith comprising:
    continuously feeding a molten metal downwardly to a continuous casting means including a mold having an opening therethrough for the continuous passage of material,
    continuously adding a multitude of discontinuous reinforcing filaments to said molten metal and predeterminately distributing said filaments in said metal entering said continuous casting means,
    forming said metal into a predetermined elongated shape in said continuous casting means, and
    solidifying said metal to define a structural shape thereof which is composed primarily of said metal encapsulating said filaments therein in a manner to reinforce said metal throughout its length with said filaments.

10. A method in accordance with claim 9, which includes first solidifying said filament containing metal into a first shape and thereafter receiving and working said first shape as it is fed to form second shape thereof.

(References on following page)

References Cited

UNITED STATES PATENTS

| | | | |
|---|---|---|---|
| 1,624,386 | 4/1927 | Betts | 29—419X |
| 1,704,256 | 3/1929 | Lorenz | 29—419X |
| 2,234,127 | 3/1941 | Mautsch | 29—419X |
| 3,038,248 | 6/1962 | Kremer | 29—419 |
| 3,084,421 | 4/1963 | McDaniels | 29—419X |
| 3,187,422 | 6/1965 | Morgan | 29—419 |
| 3,256,596 | 6/1966 | Fiedler | 29—419 |
| 3,476,529 | 11/1969 | Dubin et al. | 117—71X |
| 3,491,055 | 1/1970 | Talley. | |

JOHN F. CAMPBELL, Primary Examiner

D. C. REILEY, Assistant Examiner

U.S. Cl. X.R.

29—419, 420.5; 164—76, 86